April 24, 1951 R. T. ADAMS 2,549,761
LOW NOISE INTERMEDIATE-FREQUENCY AMPLIFIER
Filed April 30, 1947
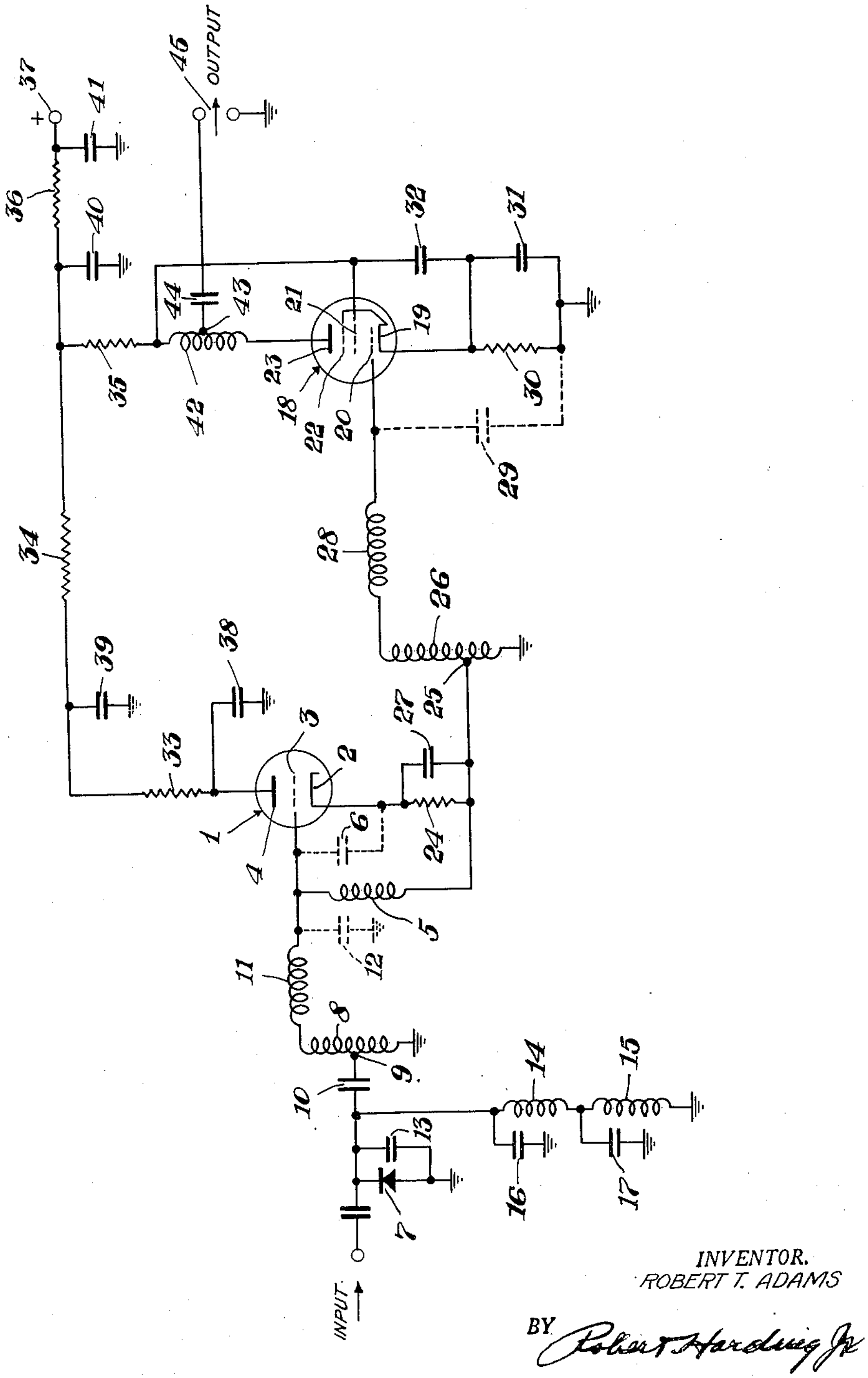
INVENTOR.
ROBERT T. ADAMS
BY Robert Harding Jr
ATTORNEY Patented Apr. 24, 1951

2,549,761

UNITED STATES PATENT OFFICE 2,549,761

LOW NOISE INTERMEDIATE-FREQUENCY AMPLIFIER

Robert Thomas Adams, Chatham, N. J., assignor, by mesne assignments, to International Standard Electric Corporation, New York, N. Y., a corporation of Delaware Application April 30, 1947, Serial No. 745,014

1 Claim. (Cl. 179—171)

This invention relates to amplifiers and particularly to low-noise wide-band, intermediate frequency amplifiers adapted to be connected to the output of crystal mixers, where the overall receiver sensitivity depends primarily on the intermediate frequency noise factor. By "noise factor" is meant the ratio of equivalent input noise to thermal noise of the source impedance.

An object of the invention is to provide an intermediate frequency low-noise amplifier which may be connected to the output of a crystal mixer with a substantial improvement in noise factor over amplifiers heretofore used for this purpose having a corresponding band width.

Another object of the invention is to provide a low-noise, intermediate frequency amplifier for connection to the output of a crystal mixer in which close control of input circuit matching is obtained.

Another object of the invention is to provide a low-noise intermediate frequency unit incorporating a crystal mixer, thus eliminating the usual connecting cables and simplifying the problem of matching.

Still another object of the invention is to provide a low-noise, intermediate frequency amplifier having a filter section input circuit.

Other objects and objects relating to the construction and assembly of the various parts of the circuit will be apparent as the description of the invention proceeds.

The invention is illustrated in the accompanying single drawing which shows a preferred embodiment thereof.

The invention comprises two amplifier tubes, the first of which is a triode and has an input circuit in the form of a filter section, permitting close match to the mixer. This tube is connected as a cathode follower and is coupled to the input circuit of the second tube by means of a network or filter section which matches the low impedance of the cathode circuit of the first tube to the high impedance of the grid input circuit of the second tube.

The first tube 1 is a triode having high mutual conductance. Such a tube is chosen because of the inherent low noise factor in triodes in general, as compared to pentodes, and the low noise factor associated with high mutual conductance. I may prefer to use a tube of the 6J6 type with the double triode elements connected in parallel. For purposes of illustration the tube is shown as having a cathode 2, a grid 3, and a plate 4. The heater and the circuit therefor have been omitted as unnecessary to a clear understanding of the invention.

The grid-cathode impedance of the tube 1 is made as high as possible by neutralizing circuit. To this end an inductance 5 is connected across the grid-cathode circuit, which inductance has the proper value to tune the grid-cathode capacity 6, which is indicated in dotted lines, to the intermediate frequency, which, for example, may be 30 megacycles.

The input from a crystal mixer 7, may be fed to the grid 3 of the tube 1 through a transformer 8 which has a single coil connected between ground and the grid of the tube, the crystal being connected to a tap 9 on the transformer through a coupling condenser 10. A series inductance 11 is connected between the transformer 8 and the grid of the tube, and is given a value such as to tune the input or grid-to-ground capacity 12 to the intermediate frequency. The combination of coils 8 and 11 with capacitance 12 forms a tuned impedance-matching network between the crystal mixer 7 and the grid 3 of tube 1. As the total noise contributed by tube 1 (referred to the input) is actually substantially less than the thermal noise of the input resistance, the aforesaid tuned impedance-matching network must be adjusted to provide a step-up ratio substantially less than the ratio of the impedance of the crystal 7 to the input impedance of the tube 1. The factors governing the degree of impedance mismatch required are well known.

Signals may be fed to the crystal by connecting the input to the same terminal of the crystal as the input to the tube 1, the other terminal of the crystal being connected to ground. A by-pass condenser 13 is shunted across the crystal, and the crystal circuit is completed through two R. F. chokes 14 and 15, connected in series between the terminal of the crystal connected to the input circuit and ground. The chokes 14 and 15 may be shunted by condensers 16 and 17, respectively.

The tube 1 is connected as a cathode-follower to a second tube 18 which may be a pentode tube, having a cathode 19, a grid 20, a screen-grid 21, a suppressor-grid 22, and a plate 23. The cathode 2 of the tube 1 is connected through a resistance 24 to a tap 25 on a coupling transformer 26, having a single coil which is connected between ground and the control grid 20 of the tube 18. A by-pass condenser 27 is connected across the resistance 24.

A series inductance 28 is connected between the transformer 26 and the grid 20 of the tube 18 and is given a value such that it will tune the input capacity 29, (indicated by dotted lines), of the tube 18 to the intermediate frequency.

The cathode 19 of the tube 18 is connected to ground in a conventional manner through self-biasing resistor 30 which is shunted by a condenser 31 for maintaining the proper bias on the cathode of the tube. The screen grid 21 and plate 23 are connected directly to the cathode through a by-pass condenser 32 for by-passing the plate and screen current.

De-coupling filters for the plate circuits of the two tubes are provided by means of resistors 33 and 34, in the plate circuit of the tube 1, and 35 and 36, in the plate circuit of the tube 2, both plate circuits leading to a common source of plate voltage indicated at 37. Filter condensers 38, 39, 40 and 41 are connected, respectively, between ground and the high potential side of the resistor 33, the high potential side of the resistors 34 and 35, and the high potential side of the resistor 36. These plate circuits are conventional.

The output is taken from an inductance 42 connected between the plate 23 of tube 18 and the resistor 35 and having such a value that the output capacity of the tube is caused to resonate at the intermediate frequency. A tap 43 on the inductance 42 is connected through a coupling condenser 44 to the output circuit, indicated at 45, and this tap is chosen to match the load impedance, which might be about 50 ohms.

By tuning the grid-cathode capacity of the tube 1 to resonance by means of the inductance 5, the grid-cathode impedance of this tube is not only made as high as possible but it also becomes inductive for frequencies below resonance and capacitive for frequencies above resonance. This fact, together with the fact that the cathode load for the tube 1 is a series resonance circuit, also tuned to the intermediate frequency and preceded by an untuned transformer which matches the internal cathode impedance to the load impedance, results in the input impedance of tube 1, measured from grid to ground, becoming the parallel sum of the following impedances:

1. Grid-to-ground capacitance, other than that indicated at 6, and represented by the condenser 12 shown in dotted lines.
2. The input conductance of the tube 1, caused by the transit time effect and the cathode load inductance, this latter inductance being somewhat reduced by feed-back.
3. A complex impedance resulting from the circuit of inductance 5 and capacitance 6, coupled between the input and output of the tube 1 and the variable output load impedance. This impedance appears as a high resistance at resonance, a high capacitive reactance plus resistance above resonance, and a high inductive reactance plus resistance below resonance.

I have found that the effective input impedance is increased nearly 50% by the degenerative action at 26 and 34 megacycles, where an intermediate frequency of 30 megacycles was used, with the resultant increase in available signal voltage at the grid.

The shot noise currents in the tube are also decreased above and below resonance in proportion to the cathode load impedance. By the combination of the coupling transformer 26 and the series resonance circuit formed by the inductance 28 and the capacitance 29, which is the input capacitance of the tube 18, a minimum voltage gain of about 3 has been realized from the grid 3 of tube 1 to the grid 20 of tube 18 over the entire band from 26 to 34 megacycles, so that noise contributed by the tube 18 or any following tubes becomes negligible. The noise contributed by the tube 1 is unusually low because a high mutual-inductance triode has inherently low shot noise and the shot noise currents are reduced by degeneration over a large portion of the useful frequency band.

The fact that the output of the tube 1 is taken from the cathode avoids troublesome effects of high grid-plate capacity and, although its result is reduced gain for the tube, as compared with a tube of comparable mutual conductance with conventional output coupling, there is a corresponding reduction in tube noise and an increase in tube input impedance resulting from degeneration. In a circuit heretofore used, a high mutual conductance triode was used as the input stage of an amplifier, the output being taken from the plate and driving a grounded-grid stage. Residual stray coupling between input and output in such a circuit tends to reduce the input circuit impedance.

With an amplifier of the type described above, using a 6J6 type triode for tube 1 and a 6AK5 type pentode tube for the tube 18, a noise factor of 4 decibels was obtained with a frequency response uniform within 3 decibels from 26 to 34 megacycles. This is equivalent to 2.2 micro-volts of noise at the input terminal. Noise factors of 6 to 7 decibels have been measured for bandwidths of 12 to 14 megacycles, measured to 3 decibels down.

By connecting the crystal directly to the input matching circuit without the use of a connecting-cable, I have been able in certain instance to reduce the required impedance ratio by nearly three to one.

It will be seen from the above description that I have provided a wide band intermediate frequency amplifier which may be fed from a crystal mixer which will have an unusually low noise output with the result that a receiver incorporating such an intermediate frequency amplifier will have increased sensitivity. Various changes in the circuit, as shown and described, will suggest themselves to one skilled in the art and I do not therefore wish to limit myself to the circuits shown and described except by the limitations defined in the appended claim.

What I desire to secure by Letters Patent and claim is:

A low noise amplifier for operation at a predetermined frequency comprising a high mutual conductance triode tube having a cathode, a grid, and a plate, a grounded input transformer connected between said grid and cathode and adapted to be connected to a low impedance source of signals to be amplified, said input circuit including an inductance coil connected between said grid and cathode and tuned with the interelectrode capacitance therebetween at said frequency to prevent oscillations by providing maximum impedance between said grid and cathode and an inductance coil connected in series between said transformer and said grid and the connection to said source of signals and series tuned with the grid to ground capacitance of said tube at said frequency for matching the impedance of said source to the input impedance of said tube.

ROBERT THOMAS ADAMS.

REFERENCES CITED

The following references are of record in the file of this patent:

UNITED STATES PATENTS

| Number | Name | Date |
|---|---|---|
| 2,210,497 | Percival | Aug. 6, 1940 |
| 2,240,715 | Percival | May 6, 1941 |
| 2,310,455 | Muller | Feb. 9, 1943 |
| 2,332,919 | Kleen | Oct. 26, 1943 |
| 2,419,882 | Bradley | Apr. 29, 1947 |